US009519512B2

(12) United States Patent
Kami

(10) Patent No.: US 9,519,512 B2
(45) Date of Patent: Dec. 13, 2016

(54) DYNAMIC PHYSICAL RESOURCE ALLOCATION IN A NETWORKED SYSTEM FOR MIGRATING VIRTUAL COMPUTERS

(75) Inventor: Nobuharu Kami, Tokyo (JP)

(73) Assignee: NEC Corporation, Tokyo (JP)

( * ) Notice: Subject to any disclaimer, the term of this patent is extended or adjusted under 35 U.S.C. 154(b) by 1210 days.

(21) Appl. No.: 12/041,226

(22) Filed: Mar. 3, 2008

(65) Prior Publication Data

US 2008/0222633 A1 Sep. 11, 2008

(30) Foreign Application Priority Data

Mar. 8, 2007 (JP) ................................ 2007-058608

(51) Int. Cl.
G06F 9/455 (2006.01)
G06F 9/48 (2006.01)
G06F 9/50 (2006.01)
G06F 3/06 (2006.01)

(52) U.S. Cl.
CPC ......... *G06F 9/4856* (2013.01); *G06F 9/45558* (2013.01); *G06F 9/5077* (2013.01); *G06F 3/0689* (2013.01); *G06F 2009/4557* (2013.01)

(58) Field of Classification Search
CPC .............................. G06F 9/4856; G06F 3/0689
USPC .......................................................... 718/1
See application file for complete search history.

(56) References Cited

U.S. PATENT DOCUMENTS

| | | | |
|---|---|---|---|
| 7,792,918 B2* | 9/2010 | Corry et al. ................... | 709/216 |
| 7,904,914 B2* | 3/2011 | Green et al. ................... | 719/321 |
| 7,996,484 B2* | 8/2011 | Mundkur et al. .............. | 709/213 |
| 2005/0198632 A1* | 9/2005 | Lantz et al. ....................... | 718/1 |
| 2005/0268298 A1* | 12/2005 | Hunt et al. ........................ | 718/1 |
| 2006/0005189 A1* | 1/2006 | Vega et al. ........................ | 718/1 |
| 2007/0204265 A1* | 8/2007 | Oshins .............................. | 718/1 |
| 2008/0155223 A1* | 6/2008 | Hiltgen et al. ................. | 711/173 |
| 2008/0222375 A1* | 9/2008 | Kotsovinos et al. .......... | 711/162 |
| 2008/0228971 A1* | 9/2008 | Rothman et al. .............. | 710/104 |
| 2011/0179415 A1* | 7/2011 | Donnellan et al. ............... | 718/1 |

FOREIGN PATENT DOCUMENTS

| | | | |
|---|---|---|---|
| JP | 2001-273242 A | 10/2001 |
| JP | 2002-024048 A | 1/2002 |
| JP | 2002-041305 A | 2/2002 |

(Continued)

OTHER PUBLICATIONS

Clark et al. (Live Migration of Virtual Machines); Proceedings of the 2nd USENIX Symposium on Networked Systems Design and Implementation, 2005; 14 pages.*

(Continued)

*Primary Examiner* — Keith Vicary
(74) *Attorney, Agent, or Firm* — Arent Fox LLP

(57) ABSTRACT

A virtual machine configuration system, comprising a virtualizer for, in a virtualization environment in which a plurality of physical resources connected mutually through a network circuit has been arranged on a computer system sectioned into a plurality of partitions, dynamically changing a physical resource configuration and a virtual machine configuration while simultaneously controlling a configuration of the physical resources of the partition and a configuration of virtual resources allotted to virtual machines without exerting an influence over an application service operating on the virtual machine.

11 Claims, 10 Drawing Sheets

(56) References Cited

FOREIGN PATENT DOCUMENTS

| JP | 2003-296035 A | 10/2003 |
|----|---------------|---------|
| JP | 2004-133894 A | 4/2004 |
| JP | 2004-234114 A | 8/2004 |
| JP | 2005-327279 A | 11/2005 |
| WO | WO-2007002398 A2 | 1/2007 |

OTHER PUBLICATIONS

Zamfir et al. (Live Migration of Virtual Block Devices); EuroSys 2007, Lisbon, Portugal; 1 page.*
Travostino et al. (Seamless Live Migration of Virtual Machines over the MAN/WAN); Future Gener. Comput. Syst., 22(8):901-907, 2006.*
Luo et al. (Live and Incremental Whole-System Migration of Virtual Machines Using Block-Bitmap); This paper appears in: Cluster Computing, 2008 IEEE International Conference on; Issue Date: Sep. 29, 2008-Oct. 1, 2008; on pp. 99-106.*
Akoush et al. (Activity Based Sector Synchronisation: Efficient Transfer of Disk-State for WAN Live Migration); MASCOTS 11; Jul. 2011; 10 pages.*
Hirofuchi et al. (Enabling Instantaneous Relocation of Virtual Machines with a Lightweight VMM Extension) In: Proceedings of the 2010 10th IEEE/ACM International Conference on Cluster, Cloud and Grid Computing (CCGrid 2010). pp. 73-83 (2010).*
Hirofuchi et al. (A Live Storage Migration Mechanism over WAN for Relocatable Virtual Machine Services on Clouds); Cluster Computing and the Grid, 2009; CCGRID '09. 9th IEEE/ACM International Symposium on, pp. 460-465.*
Hines et al. (Post-Copy Live Migration of Virtual Machines); SIGOPS Oper. Syst. Rev., vol. 43, No. 3, pp. 14-26, 2009.*
Hirofuchi et al. (A Live Storage Migration Mechanism over WAN and its Performance Evaluation) in Proceedings of the 3rd International Workshop on Virtualization Technologies in Distributed Computing. ACM Press, Jun. 2009, pp. 67-74.*
Kadav et al. (Live Migration of Direct-Access Devices); In First Workshop on I/O Virtualization (WIOV '08), Dec. 2008; pp. 95-104.*
Svard et al. (Evaluation of Delta Compression Techniques for Efficient Live Migration of Large Virtual Machines); in: Proceedings of the 7th ACM SIGPLAN/SIGOPS international conference on Virtual execution environments (VEE '11). pp. 111-120 (2011).*
Bradford et al. (Live Wide-Area Migration of Virtual Machines Including Local Persistent State); Proceeding VEE '07 Proceedings of the 3rd international conference on Virtual execution environments; 2007; 11 pages.*
Haselhorst et al. (Efficient Storage Synchronization for Live Migration in Cloud Infrastructures); This paper appears in: Parallel, Distributed and Network-Based Processing (PDP), 2011 19th Euromicro International Conference on; on pp. 511-518; Issue Date: Feb. 9-11, 2011.*
Vmware (VMware VirtualCenter—User's Manual); Version 1.4; 508 pages; 2006.*
Van Kleij et al. (Virtual Machine WAN Migration with DBRD); OS3 report; 2008-2009; 4 pages; Retrieved from https://www.os3.nl/_media/2008-2009/students/attilla_de_groot/virt_migration.pdf on Aug. 17, 2011.*
Venkatesha et al. (Survey of Virtual Machine Migration Techniques); Technical Report, Dept. of Computer Science, University of California, Santa Barbara, 2009; 10 pages.*
P. Barham, et al., "Xen and the Art of Virtualization," In Proc. SOSP 2003, Bolton Landing, New York, Oct. 19-22, 2003, pp. 1-14.
Homepage of VMware, Inc., http: //www.vmware.com/.
Miyahara, Tetu et al.; "NOZU Arata, Manual for Introducing & Utilizing Xen, Virtualization Technology Expert"; issued by Gijutsu-Hyohron Co., Ltd., Mar. 1, 2007, pp. 77-83.
Office Action issued by Japanese Patent Office for corresponding Appl No. JP2007-058608, issued May 9, 2012 with English translation of Concise Relevance.

* cited by examiner

DYNAMIC PHYSICAL RESOURCE ALLOCATION IN A NETWORKED SYSTEM FOR MIGRATING VIRTUAL COMPUTERS

INCORPORATION BY REFERENCE

This application is based upon and claims the benefit of priority from Japanese patent application No. 2007-058608, filed on Mar. 8, 2007, the disclosure of which is incorporated herein in its entirety by reference.

RELATED ART

The present invention relates to a virtual machine configuration system and a method thereof, and more particularly to a virtual machine configuration system and a method thereof that make it possible to provide a virtualization environment having a plurality of computer machines in which resources are efficiently utilized.

As one example of a computer system or a network system in recent years, there exists the system into which a configuration, which enables a plurality of operating systems (OS) to concurrently operate on an identical physical server by introducing a virtualizer called a Virtual Machine Monitor (VMM), has been introduced. Each OS is installed onto a physical server, and likewise, the OS is installed onto a virtual server having a virtual resource called a Virtual Machine (VM), respectively. The VMM handles each VM as a software entity, time-division-multiplexes a physical resource, and allots these time slots to a plurality of the virtual resources, thereby allowing resource sharing between the VMs to be realized. The VMM, which has various architectures, is typified by VMware described in Non-patent document 2, Xen described in Non-patent document 1, or the like.

Herein, as shown in FIG. 1, each of virtualizers 1008 and 1009 such as VMware and Xen provides a "Migration" function of migrating a virtual machine 1010 that is operating on a physical machine (physical server 1001) to a physical machine (physical server 1002) as a technique of nothing but its virtualization. The migration function can be realized by securing an access to both of memory data 1012 existing on a memory 1004 of the physical machine 1001 and disc data 1013 existing on a disc 1005 because the VM is software, as a matter of fact. This function is utilized, for example, for maintenance such as a modification to the system configuration, and for a countermeasure being taken at the time that a failure has occurred in the physical server, or the like.

Herein, utilizing the "Migration" function necessitates adjustability of the virtual resource and the physical resource configuration caused to correspond hereto in addition to copying of the memory data. The reason is that when an access to the virtual resource is made, if the physical resource, being an entity that corresponds hereto, does not exist, the operation cannot be performed normally. For example, upon thinking about a disc device, also after the disc device has been migrated to the other physical server, a viewpoint of the virtual machine demands accessibility to data on the above disc device. The reason is that in a case where the disc access has occurred due to an access by a software process on the VM to the data, absence of the physical disc, being an entity, causes an error to be generated, and resultantly, makes the normal operation impossible. For this, it becomes necessary to secure an access to the device utilized prior to the "Migration" operation judging from a viewpoint of a continuity of the service.

The following techniques are thinkable for the "Migration" operation employing the conventional technique.

<Conventional Technique 1: the "Migration" Operation Accompanied by Installing the Disc>

The normal operation, as illustrated in FIG. 2, is realized by migrating/installing the disc of the server utilized prior to the "Migration" operation to/onto the server of a "Migration" destination, and causing this disc to newly correspond to the virtual disc on the virtual machine.

There are the following procedures.

(Procedure 1) The VM is stopped.

(Procedure 2) A memory copy of the VM is preserved.

(Procedure 3) The disc into which data associated with the VM of the server utilized prior to the migration has been input is migrated to the server of the migration destination, and is caused to correspond to the virtual disc of the VM.

(Procedure 4) The VM is re-started by copying the copied memory data of the VM to a memory space for the VM newly mounted on the server of the migration destination.

The "Migration" operation is completed through the above-mentioned procedures. Herein, the VM is basically stopped while this "Migration" operation is performed, and a continuity of the service that is to be originally provided on the VM is not secured.

<Conventional Technique 2: a "Live Migration" Function+File-Sharing System>

In addition hereto, as described in Non-patent document 1 and Non-patent document 2, each of VMware and Xen provides a function as well called "Live Migration" function that allows the "Migration" operation to be realized without interrupting the service.

Herein, more specifically, the so-called "Live Migration" function is a function of copying data associated with the VM existing in the memory of the server utilized prior to the migration to a memory region of the VM prepared on the server of the migration destination, making the setting necessary, for example, the setting of an access to the physical resources such as the disc and the network interface device, thereafter, stopping and deleting the VM on the server utilized prior to the migration, re-copying information renewed during the just last memory copy, causing both pieces of information of the VMs to completely synchronize with each other, and yet thereafter, operating the VM on the server of the migration destination. Herein, as a rule, the so-called no-interruption signifies that the service is stopped to perform a migration operation in a moment, precisely speaking, in a short time such that a service providee cannot grasp the stopping of the service. The session looks like as if it had not been interrupted when viewed from the user employing this VM because the stopping time is typically in the order of several tens to several hundreds of ms.

At this time, in a case where the physical resource is a disc as described in the related art, it is necessary that the disc data can be accessed from the virtual machine with some method. For example, securing an access to the disc device, as shown in FIG. 3, necessitates pre-constructing the file-sharing system between a physical server 3001 utilized prior to the migration and a physical server 3002 of the migration destination. There is often the case that this is provided by adapter units 3006 and 3009 connecting a disc-sharing machine 3000 that is realized with a sharing technology of the storage being typified, for example, by a Storage Area Network (SAN), and the physical servers 3001 and 3002, respectively. Even though, as a matter of fact, an entity of a disc data 3024 is a disc data 3014 existing on a disc 3013, this is a technology of making a virtual disc 3007 look like if it had virtually existed on the physical server 3001, and yet making a disc data 3024 look like as if it had existed on it. The above-mentioned procedure 3 is omitted and only the stopping time during the copying of the memory is left over because an identical directory path is visible from both of the server utilized prior to the migration and the server of the migration destination. Further, an attempt to shorten this stopping time or the like is made by finally curtailing the quantity of the copy, which is made after stopping the VM, as much as possible with the method of copying the memory data one after another if possible, namely, the method of copying only the memory data that has been changed in the second-time copy and thereafter for a purpose of shortening this stopping time. The "Migration" time in this case is typically in the order of several tens to several hundreds of ms, depending upon the quantity of the memory copy, whereby, for example, for the typical application such as a Web application, it can be safely said that this "Migration" time is in the order of the time such that the no-interruption is justified from a viewpoint from the user.

However, a transfer delay occurs in these methods, which premise that the disc data is shared via the network. Further, the SAN etc. requires a dedicated device, and with the system of virtually sharing the disc via the network, for example, nfs, an overhead of the protocol process thereof as well hangs. Thereupon, a circuit for actually migrating the physical resource to the server requiring it is thinkable. The method of manually removing the device, installing it into the server of the migration destination, and thereafter, performing the "Migration" operation is thinkable; however this is partly grounded upon the presumption that the system is stopped once similarly to the case of the related art 1, and further requires the time as well.

[Non-patent document 1] P. Barham et al. Xen and the art of virtualization. In Proc. SOSP 2003. Bolton Landing, N.Y., U.S.A. Oct. 19-22, 2003

[Non-patent document 2] Homepage of VMware, Inc., http://www.vmware.com/

The first point at issue is a point that the related art does not include a mechanism for automatically making an adjustment of the physical resource configuration and the virtual resource configuration in the "Migration" operation of the VM.

The reason lies in a point that, in the related art 1, a service continuity is difficult to secure when seen from a user's standpoint because the physical resource is caused to correspond to the virtual resource after making a re-configuration in the physical resources, for example, after manually deleting/installing the physical device.

The second point at issue is a point that, for example, also so as to migrate the VM to the other physical server with the service continuity kept by employing the "Live Migration", the disc-sharing system is necessitated both before and after the "Migration" operation.

The reason lies in a point that, so as to secure a continuity of the service as described in the first point at issue, an access to the disc data by both servers has to be secured before and after the "Migration" operation of the VM. For this, the virtual file system that is sharedly visible from both servers has to be constructed. This necessitates the expensive dedicated device such as the SAN, and the virtualization with the software such as network file system (NFS) causes the overhead of the protocol processing to hang.

SUMMARY OF THE INVENTION

Thereupon, the present invention has been accomplished in consideration of the above-mentioned problems, and an exemplary object thereof is to provide a "Live Migration" operation of a VM, being a "VM Migration" function having a service continuity characterized in the minimum stopping time equal to that of the sharing system+"Live Migration" function, which is accomplished with only the partition control and the "Live Migration" function by simultaneously controlling the physical resource configuration and related information of the virtual resource configuration without employing the device-sharing system such as the SAN, for example, for the disc.

The 1st invention for solving the above-mentioned problems is characterized in that: a virtual machine configuration system, comprising a virtualizer for, in a virtualization environment in which a plurality of physical resources connected mutually through a network circuit has been arranged on a computer system sectioned into a plurality of partitions, dynamically changing a physical resource configuration and a virtual machine configuration while simultaneously controlling a configuration of the physical resources of the partition and a configuration of virtual resources allotted to virtual machines without exerting an influence over an application service operating on the virtual machine.

In the above-mentioned invention, the 2nd invention for solving the above-mentioned problems is characterized in that the virtual machine configuration is a configuration of the partition in which the virtual machine operates, and the virtual resource being provided by said virtualizer.

In the above-mentioned inventions, the 3rd invention for solving the above-mentioned problems is characterized in that the partition is switched with a dynamic bus controller as a way of migrating the physical resource.

In the above-mentioned inventions, the 4th invention for solving the above-mentioned problems is characterized in that the virtualizer divides a utilization time of the physical machine into time divisions and allots them, thereby allowing a plurality of operation systems to operate simultaneously.

In the above-mentioned inventions, the 5th invention for solving the above-mentioned problems is characterized in that the physical resource is one of an I/O device, a non-volatiles memory device into which data associated with the virtual machine has been stored, a network interface device, and an accelerator device having a dedicated processing function, or a combination thereof.

In the above-mentioned invention, the 6th invention for solving the above-mentioned problems is characterized in that said virtual resource configuration is detailed configuration information of the virtual resource caused to correspond to the physical resource for a purpose of enabling said virtualizer to utilize the physical resource.

In the above-mentioned inventions, the 7th invention for solving the above-mentioned problems is characterized in that the dynamic change of the virtual machine configuration is to copy a memory data existing on a volatile memory, said volatile memory constituting a virtual machine operating on a partition 1, to a memory region of a virtual machine identical to the virtual machine on the partition 1, said memory region prepared by the virtualizer on a partition 2, and to delete the memory data of the virtual machine on the partition 1.

In the above-mentioned inventions, the 8th invention for solving the above-mentioned problems is characterized in that the change of the physical resource configuration is to delete the physical resource belonging to the partition 1 from the partition 1 with a setting change by the above network circuit, and to re-register it into the partition 2.

In the above-mentioned inventions, the 9th invention for solving the above-mentioned problems is characterized in that the dynamic and simultaneous management of the physical resource configuration of the partition and the configuration of the virtual resources allotted to the virtual machines is to make a reference to dynamic information of the physical resource configuration as to which partition the physical resources belong to and information as to whether the physical resource is utilizable or not, and information of the configuration of the virtual resource allotted to the virtual machine, and to adjust a difference of its configuration that can be generated between before and after the above virtual machine is migrated to the other partition.

In the above-mentioned inventions, the 10th invention for solving the above-mentioned problems is characterized in that the adjustment of a difference of a configuration is that, when a difference between the physical resource configuration of the partition to which the virtual machine belonged before migration and that of a migration destination exists at the moment that the virtual machine migrates, its difference of the physical resource is concealed from a view of the virtual machine, and a function of the physical resource is implemented with software emulation.

In the above-mentioned inventions, the 11th invention for solving the above-mentioned problems is characterized in that the adjustment of a difference is to absorb a difference of data that is generated during migration to the other partition, said data associated with the virtual machine stored in a non-volatile storage device.

In the above-mentioned inventions, the 12th invention for solving the above-mentioned problems is characterized in that the adjustment of a difference of data is to mirror two hard discs or more, to synchronize mirrored discs with each other, to configure one virtual disc of the mirrored discs, respectively, to provide them to a virtual machine 1 and a virtual machine 2, to delete these hard discs one by one from the partition with a setting change by the network circuit at the moment of migrating the virtual machine, to re-register the hard discs into another partition, thereby allowing the hard discs to be migrated, and to write a difference of data generated until migration of the virtual machine is completed into the migrated hard discs.

In the above-mentioned inventions, the 13th invention for solving the above-mentioned problems is characterized in that a configuration is made so that acquisition of a difference of data is implemented by monitoring a process that is transferred from the virtual resource to the physical resource, and acquiring/preserving a process generated from the virtual machine as buffer data.

In the above-mentioned invention, the 14th invention for solving the above-mentioned problems is characterized in that a configuration is made so that a status of only one part of the virtual resources provided to the virtual machine is converted to a temporal wait status during the adjustment of a difference of data.

In the above-mentioned inventions, the 15th invention for solving the above-mentioned problems is characterized in that the network circuit is Ethernet.

In the above-mentioned inventions, the 16th invention for solving the above-mentioned problems is characterized in that Virtual Machine Monitor is employed as said virtualizer.

In the above-mentioned inventions, the 17th invention for solving the above-mentioned problems is characterized in that software RAID1 is employed as a way of synchronization.

In the above-mentioned inventions, the 18th invention for solving the above-mentioned problems is characterized in that an external management server exists, and management agent software exists on each partition; and wherein a configuration is made so that an operation of the management agent software is performed with issuing a command to the management agent software from the external management server as a turning point.

In the above-mentioned inventions, the 19th invention for solving the above-mentioned problems is characterized in that a software emulation function is configured so that simultaneously managing the virtual resource configuration and the physical resource configuration allows a concentrated management server to retrieve a necessary software component, and the software component to be automatically installed.

The 20th invention for solving the above-mentioned problems is characterized in that a virtual machine configuration method, comprising a virtualization step for, in a virtualization environment in which a plurality of physical resources connected mutually through a network circuit has been arranged on a computer system sectioned into a plurality of partitions, dynamically changing a physical resource configuration and a virtual machine configuration while simultaneously controlling a configuration of the physical resources of the partition and a configuration of virtual resources allotted to virtual machines without exerting an influence over an application service operating on the virtual machine.

In the above-mentioned invention, the 21st invention for solving the above-mentioned problems is characterized in that said virtual machine configuration is a configuration of the partition in which the virtual machine operates, and the virtual resource being provided by a virtualizer.

In the above-mentioned inventions, the 22nd invention for solving the above-mentioned problems is characterized in that the partition is switched with a dynamic bus controller as a way of migrating the physical resource.

In the above-mentioned inventions, the 23rd invention for solving the above-mentioned problems is characterized in that said virtualization step divides a utilization time of the physical machine into time divisions and allots them, thereby allowing a plurality of operation systems to operate simultaneously.

In the above-mentioned inventions, the 24th invention for solving the above-mentioned problems is characterized in that said physical resource is one of an I/O device, a non-volatiles memory device into which data associated with the virtual machine has been stored, a network interface device, and an accelerator device having a dedicated processing function, or a combination thereof.

In the above-mentioned inventions, the 25th invention for solving the above-mentioned problems is characterized in that said virtual resource configuration is detailed configuration information of the virtual resource caused to correspond to the physical resource for a purpose of enabling to utilize the physical resource.

In the above-mentioned inventions, the 26th invention for solving the above-mentioned problems is characterized in that the dynamic change of the virtual machine configuration is to copy a memory data existing on a volatile memory, said volatile memory constituting a virtual machine operating on a partition 1, to a memory region of a virtual machine identical to the virtual machine on the partition 1, said memory region prepared by a virtualizer on a partition 2, and to delete the memory data of the virtual machine on the partition 1.

In the above-mentioned inventions, the 27th invention for solving the above-mentioned problems is characterized in that the change of the physical resource configuration is to delete the physical resource belonging to the partition 1 from the partition 1 with a setting change by the above network circuit, and to re-register it into the partition 2.

In the above-mentioned inventions, the 28th invention for solving the above-mentioned problems is characterized in that the dynamic and simultaneous management of the physical resource configuration of the partition and the configuration of the virtual resources allotted to the virtual machines is to make a reference to dynamic information of the physical resource configuration as to which partition the physical resources belong to and information as to whether the physical resource is utilizable or not, and information of the configuration of the virtual resource allotted to the virtual machine, and to adjust a difference of its configuration that can be generated between before and after the above virtual machine is migrated to the other partition.

In the above-mentioned inventions, the 29th invention for solving the above-mentioned problems is characterized in that the adjustment of a difference of a configuration is that, when a difference between the physical resource configuration of the partition to which the virtual machine belonged before migration and that of a migration destination exists at the moment that the virtual machine migrates, its difference of the physical resource is concealed from a view of the virtual machine, and a function of the physical resource is implemented with software emulation.

In the above-mentioned inventions, the 30th invention for solving the above-mentioned problems is characterized in that the adjustment of a difference is to absorb a difference of data that is generated during migration to the other partition, said data associated with the virtual machine stored in a non-volatile storage device.

In the above-mentioned inventions, the 31st invention for solving the above-mentioned problems is characterized in that the adjustment of a difference of data is to mirror two hard discs or more, to synchronize mirrored discs with each other, to configure one virtual disc of the mirrored discs, respectively, to provide them to a virtual machine 1 and a virtual machine 2, to delete these hard discs one by one from the partition with a setting change by the network circuit at the moment of migrating the virtual machine, to re-register the hard discs into another partition, thereby allowing the hard discs to be migrated, and to write a difference of data generated until migration of the virtual machine is completed into the migrated hard discs.

In the above-mentioned inventions, the 32nd invention for solving the above-mentioned problems is characterized in that a configuration is made so that acquisition of a difference of data is implemented by monitoring a process that is transferred from the virtual resource to the physical resource, and acquiring/preserving a process generated from the virtual machine as buffer data.

In the above-mentioned inventions, the 33rd invention for solving the above-mentioned problems is characterized in that a configuration is made so that a status of only one part of the virtual resources provided to the virtual machine is converted to a temporal wait status during the adjustment of a difference of data.

In the above-mentioned inventions, the 34th invention for solving the above-mentioned problems is characterized in that the network circuit is Ethernet.

In the above-mentioned inventions, the 35th invention for solving the above-mentioned problems is characterized in that Virtual Machine Monitor is used in said virtualization step.

In the above-mentioned inventions, the 36th invention for solving the above-mentioned problems is characterized in that software RAID 1 is employed as a way of synchronization.

In the above-mentioned inventions, the 37th invention for solving the above-mentioned problems is characterized in that an external management server exists, and management agent software exists on each partition; and wherein a configuration is made so that an operation of the management agent software is performed with issuing a command to the management agent software from the external management server as a turning point.

In the above-mentioned inventions, the 38th invention for solving the above-mentioned problems is characterized in that a software emulation function is configured so that simultaneously managing the virtual resource configuration and the physical resource configuration allows a concentrated management server to retrieve a necessary software component, and the software component to be automatically installed.

The 39th invention for solving the above-mentioned problems is characterized in that a program for causing an information processing unit to execute a virtualization process of, in a virtualization environment in which a plurality of physical resources connected mutually through a network circuit has been arranged on a computer system sectioned into a plurality of partitions, dynamically changing a physical resource configuration and a virtual machine configuration while simultaneously controlling a configuration of physical resources of the partition and a configuration of virtual resources allotted to virtual machines without exerting an influence over an application service operating on the virtual machine.

The effect of the present invention lies in a point of making it possible to provide a service continuity, of which the level is identical to that of the system presuming that the disc-sharing system being typified by SAN etc. is utilized, only with the conventional migration of the disc device at the moment of migrating the virtual machine to a different physical machine in a visualization environment.

The reason is that the present invention makes it possible to make a configuration so that by performing a migration operation of the disc device between the physical machines in a background independent of the service that is provided by the virtual machine, a time necessary for its migration does not exert an influence over a continuity of the service.

BRIEF DESCRIPTION OF THE DRAWINGS

This and other objects, features and advantages of the present invention will become more apparent upon a reading of the following detailed description and drawings, in which.

EXEMPLARY EMBODIMENTS

Figure 9:
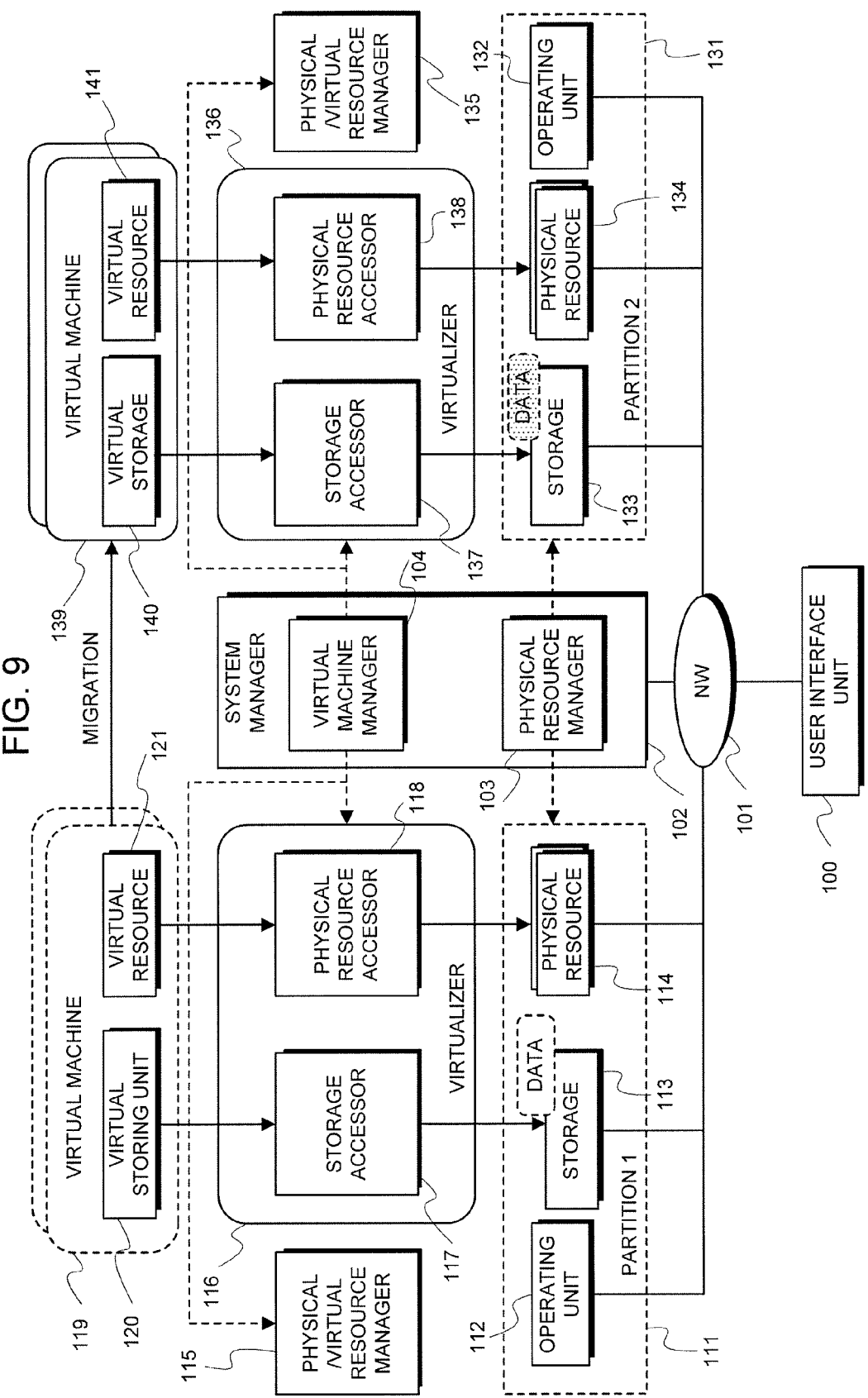
FIG. 9 is a block diagram for explaining an exemplary example 3 of the present invention.

According to FIG. 9, a first embodiment of the present invention is configured of: partitions 111 and 131 that include operating units 112 and 132, storages 113 and 133, and physical resources (hereinafter, simply referred to as a resource) 114 and 134, each of which is connected via a network 101 and is a resource capable of making data communication, and have been group-set in such a manner that the resources, which do not belong to a group, look as if they were invisible, respectively; virtualizers 116 and 136 for preparing, operating, and managing virtual machines 119 and 139 that operate on the partitions 111 and 131, respectively; physical/virtual resource managers 115 and 135 that operate on the partitions 111 and 131, respectively; a system manager 102 for managing the entirety of this system that includes a virtual machine manager 104 for managing the virtual machine 119, and a physical resource manager 103 for managing a configuration of physical resources; and a user interface unit 100 connected to this system by the network 101 for a purpose of allowing an administrator to access this system.

Herein, each of the physical resources 114 and 134, which is typified by I/O devices such as a disc device and a network interface device, is a accelerator, for example, a video card, a sound card, or a TCP off-load engine; however each physical resource is not always limited to the accelerator, and as a rule, a plurality of the physical resources exist in one partition.

The network 101, which is a network apparatus that is typified by an Ethernet (Registered Trademark) network switch etc., is not limited hereto. Further, the partition 111, the partition 131, the user interface unit 100, and the system manager 102 are all connected via the identical network 101, and it is also possible to connect them via a plurality of different-system networks.

The system manager 102, which is software operating on the computer machine, has a function of managing the virtual machine on the system, and a function of managing the physical resources, the partition configuration, and so on.

Each of the operating units 112 and 132 is an operating device that is typified by a CPU, each of the storages 113 and 133 is a memory device, and each of the partitions 111 and 131 is group-set so as to include at least one operating unit and one storage.

The group setting is realized with a grouping function that is typified by a data transfer filtering setting such as the VLAN setting of the network 101; however realization of the group setting is not always made therewith.

Each of the virtualizers 116 and 136, which is a virtualizer that is typified by the VMM such as Xen, time-division-multiplexes the resource, and provides respective time slots to a plurality of the virtual machines as a virtual resource. Virtual resources 121 and 141, and virtual storages 120 and 140 are time slots allotted by time-division-multiplexing the storages 113 and 133, and the physical resources 114 and 134, respectively.

Each of storage accessors 117 and 137 has a function of dividing the physical storage for a plurality of the virtual machines so that no contradiction occurs, and enabling respective virtual machines to safely access the storages, and when a software process on the virtual machine accesses data on the virtual storage, it accesses the data through this storage accessor. Likewise, physical resource accessors 118 and 138 have a function of enabling a plurality of the virtual machines to access the physical resources 114 and 134, respectively, and coordinating so that no resource competition occurs.

Each of physical/virtual resource managers 115 and 135 has a function of monitoring physical resource information, and making a management so that no contradiction occurs and the operation is normally performed at the moment of causing the virtual resource and the physical resource to correspond to each other and setting the physical resource accessor. In particular, as described later, it has a function of managing a virtual machine configuration that dynamically changes due to the "Migration" of the virtual machine (VM), and a physical resource configuration that dynamically changes due to the partition control, and a status of thereof, and guaranteeing a normal operation.

Next, an operation for securing a service continuity at the moment of performing a "Migration" operation of the VM from the partition 111 to the partition 131 will be explained in details by employing this configuration. Herein, it is assumed that the VM being migrated is the virtual machine 119 and the virtual machine 119 has utilized the physical resource of the physical resource 114 of the partition 111, and no other physical resource than the physical resource 134, which provides a function similar to that of the physical resource 134, exists in the partition 131.

At first, the administrator issues a "Migration" command for migrating the virtual machine 119 from the partition 111 to the partition 131 by employing the user interface unit 100. When the "Migration" command arrives at the system manager 102, the virtual machine manager 104 causes the physical/virtual resource manager 135 to start to monitor the status of the physical resource 134 of the partition 131. Herein, the physical/virtual resource manager 135 may execute this monitoring of the status at any time after starting up. After starting to monitor the status, the physical resource accessor 138 emulates an operation of the physical resource 114 as if the physical resource 114 had actually existed in the partition 131 when viewed from the virtual machine operating on the virtualizer 136, and secures a normal operation status.

Next, the virtual machine manager 104 issues a "Live Migration" command to the virtualizer 116, and performs a "Live Migration" operation of the virtual machine 119 from the partition 111 to the partition 131. Further, simultaneously therewith, the physical resource manager 103 migrates the physical resource 114 to the partition 131 by controlling the network 101.

The virtual machine 119 for which the "Live Migration" operation has been performed starts an operation as the virtual machine 139, and at its moment, when an access to the physical resource 114 has occurred before the physical resource 114 is recognized/set on the partition 131 and yet becomes accessible, the above-mentioned physical resource accessor 138 secures a service continuity by emulating an operation of the physical resource 114.

When the physical resource 114 has been migrated to the partition 131, and the recognition/setting necessary has been completed, the physical/virtual resource manager 135 detects its completion, and notifies it to the physical resource accessor 138. Upon receiving its notification, the physical resource accessor 138 makes a switchover to an access to the actual physical resource from the emulation.

With this emulation function, the virtual machine can avoid interruption of the service accompanied by the migration of the physical resource, and compatibility of a flexible re-configuration caused by the migration of the physical resource between the partitions and a high continuity of the service is enabled.

Further, the physical resource accessors 118 and 138 converts the status of the virtual resources 121 and 141 to a suspension status by bringing the process, which has occurred in the virtual resource, to a wait status, respectively. This makes it possible to keep a continuity of the service, which has no relation to the physical resource being migrated, without stopping the entirety of the virtual machine by suspending the operation of only the corresponding virtual resource and allowing the software process on the virtual machine, which utilizes the physical resources other than its physical resource, to normally operate also when the physical resource is not in a status of being utilizable. This suspending process does not trigger a process error because a response of the virtual resource seems to haven been delayed when viewed from the virtual machine. This suspending process makes it possible to successively utilize the virtual resource caused to correspond to the physical resource other than the physical resource having a relation to the migration by implementing a transition to the suspension status just before the migration, and canceling the suspension status after the migration upon confirming an operation of the emulation function in the operation of the "Migration".

Example

Hereinafter, an exemplary example of the present invention will be explained in details by employing the accompanied drawings.

(Disc Redundancy)

Figure 1:
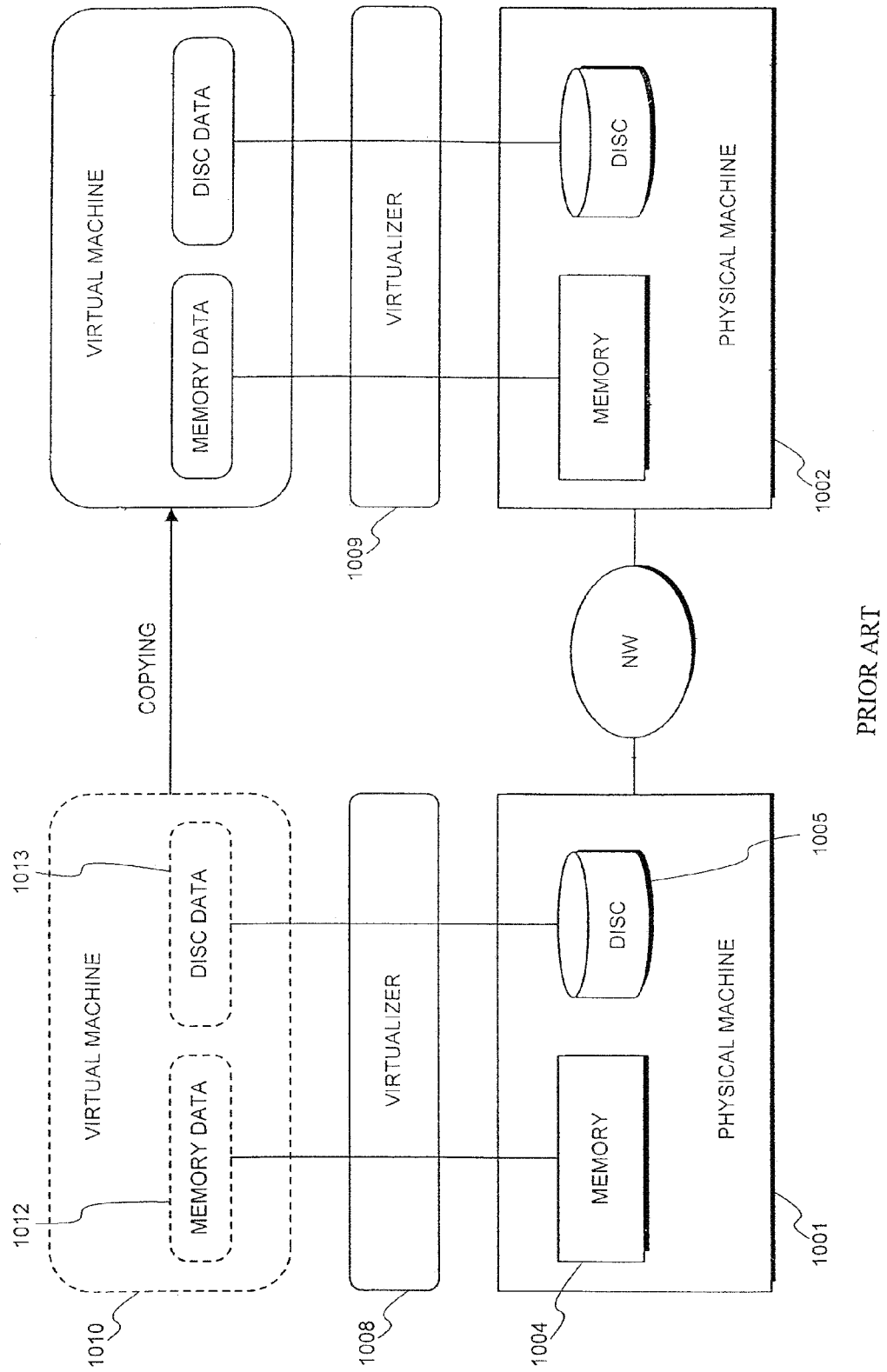
FIG. 1 is a view for explaining "VM Migration" by the conventional memory data and disc data copy.
Figure 2:
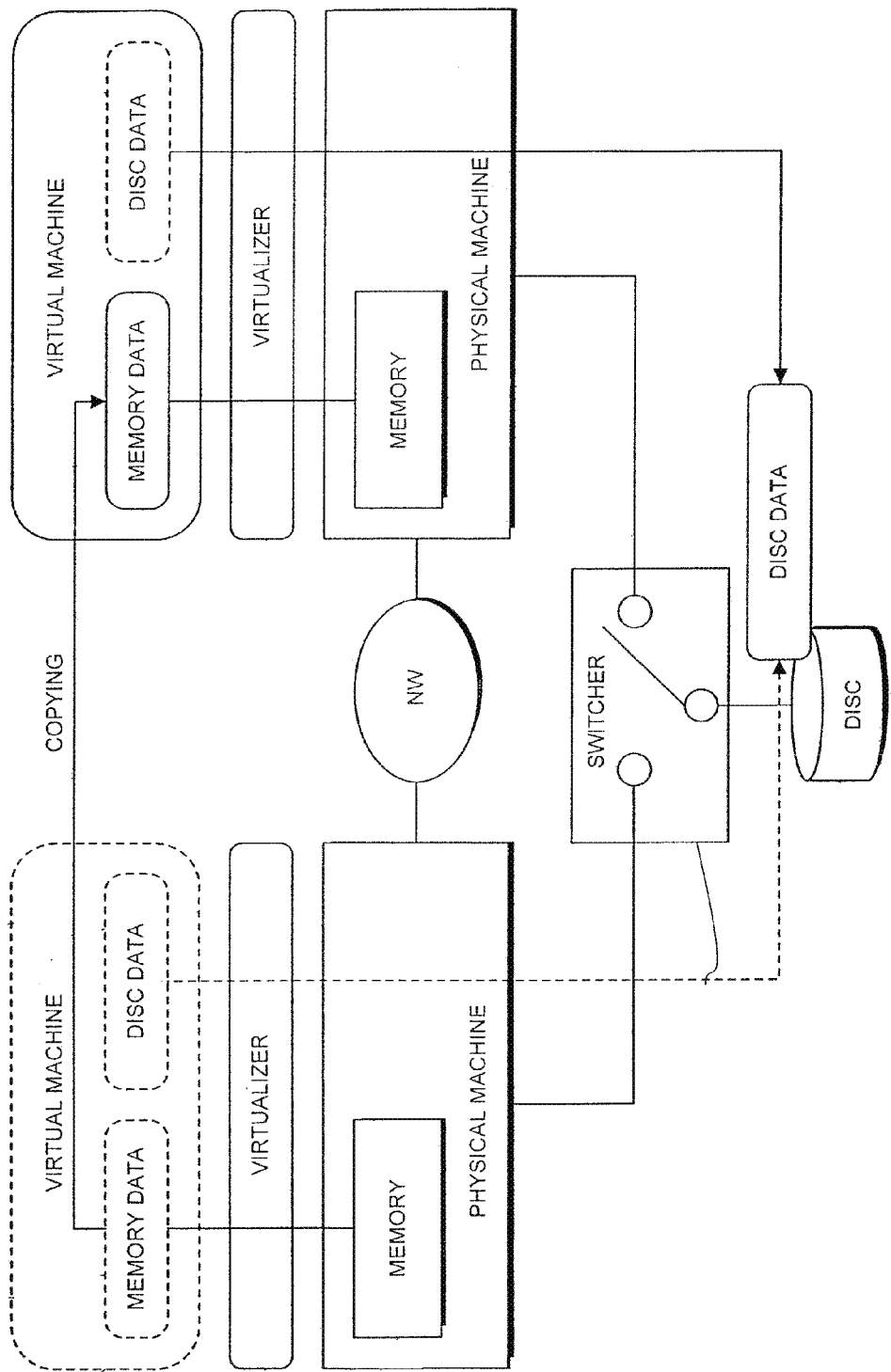
FIG. 2 is a view for explaining the "VM Migration" by the conventional memory data copy and partition switch of the disc having disc data.
Figure 3:
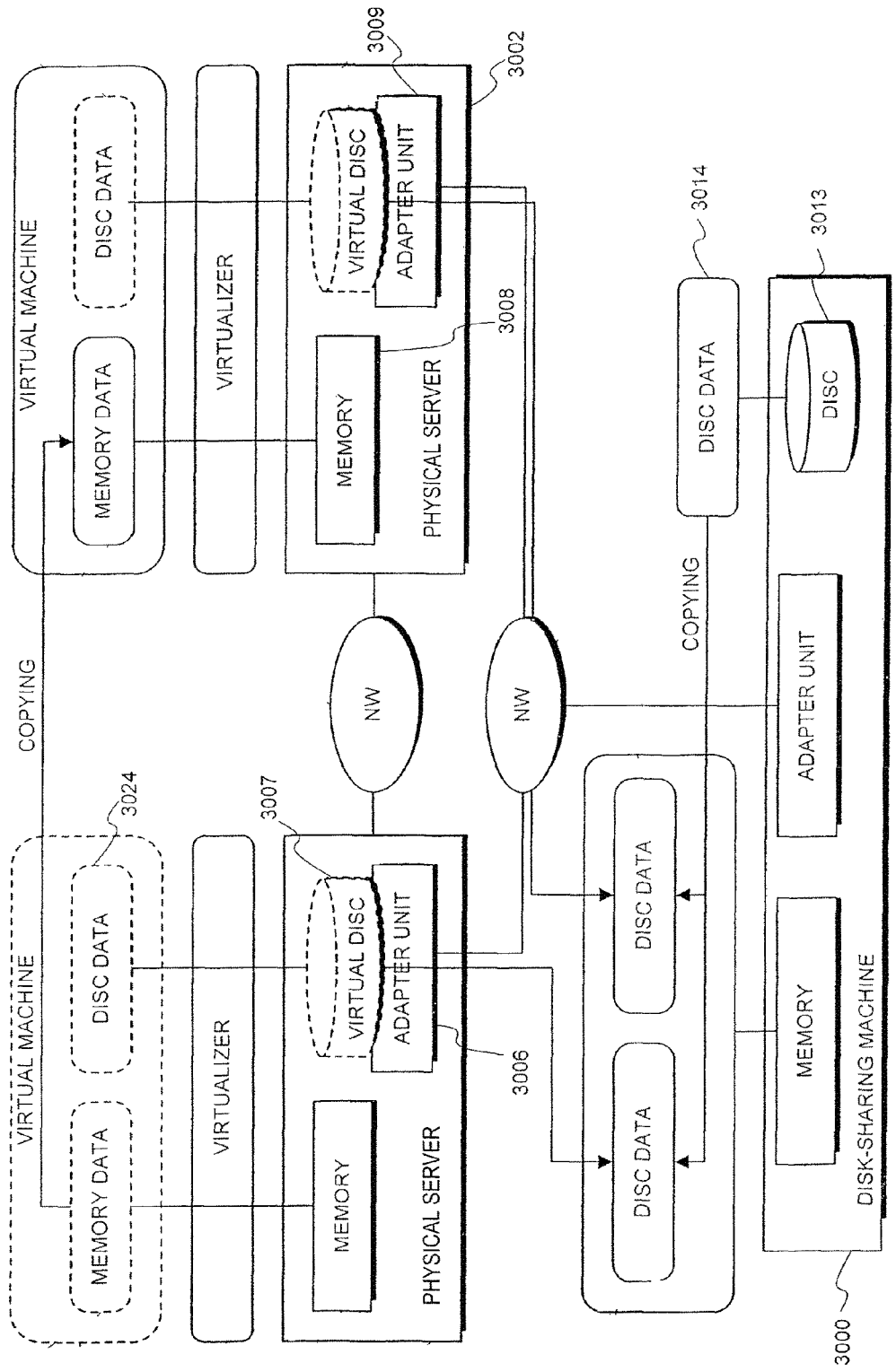
FIG. 3 is a view for explaining "Live Migration" of the VM by the conventional memory data copy and disc-sharing system.
Figure 4:
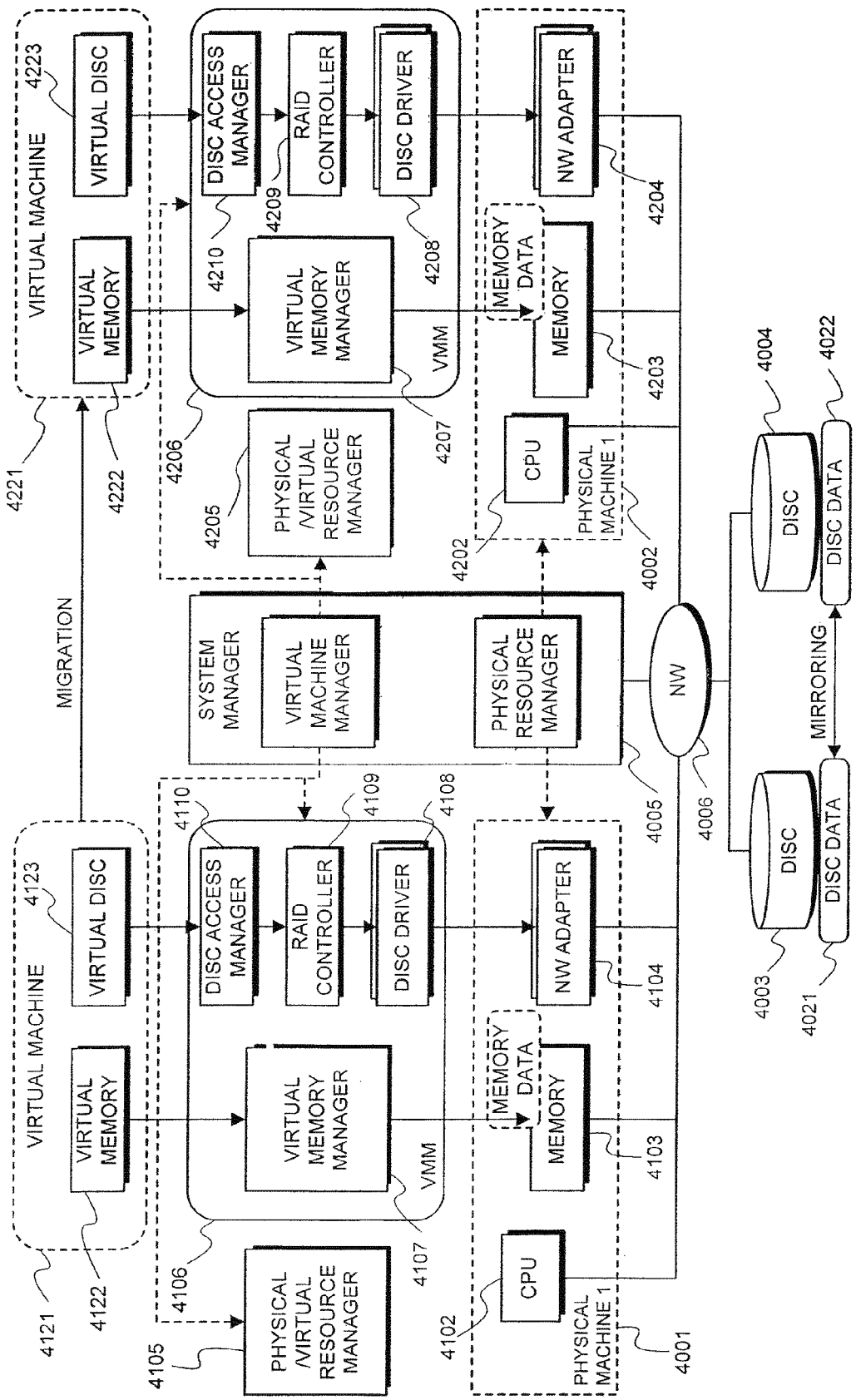
FIG. 4 is a view for explaining no-interruption "Migration" by a memory copy, a device for switching a partition of the disc, a redundancy-providing function, and a synchronous control in an exemplary embodiment of the present invention.

According to FIG. 4, as a first embodiment of the present invention, the system is provided that is configured of physical machines 4001 and 4002 each of which is connected with the other via a NW circuit 4006 and is capable of making data communication, discs 4003 and 4004 each of which is connected to the physical machine 4001 or the physical machine 4002, and a system manager 4005.

Herein, each of the discs 4003 and 4004, which is a non-volatile memory device that is representatively typified by a hard disc, is not limited hereto.

The physical machines 4001 and 4002 are configured of CPUs 4102 and 4202, memories 4103 and 4203, and network adapters 4104 and 4204, respectively.

Each of the memories 4103 and 4203, which is a non-volatile memory device that is typified by a RAM (Random Access Memory), is not limited hereto.

Each of VMMs 4106 and 4206, which is a virtualizer that is typified by a VMM (Virtual Machine Monitor) such as Xen, is not limited hereto. Further, the above VMMs 4106 and 4206 particularly includes virtual memory managers 4107 and 4207, disc access managers 4110 and 4210, disc drivers 4108 and 4208, RAID controllers 4109 and 4209, respectively.

The disc drivers 4108 and 4208 are software that is typified by a device driver for allowing an access to the discs 4003 and 4004, respectively, and the RAID controllers 4109 and 4209 are RAID controllers for causing the discs 4003 and 4004 to synchronize with disc data 4021 and 4022 with a software RAID, thereby to provide redundancy for the discs 4003 and 4004, respectively, and for making the discs 4003 and 4004 look like as if they were one disc. The disc access managers 4110 and 4210 manage accesses to the discs 4003 and 4004, each of which is a physical disc, responding to accesses to the virtual discs 4123 and 4223, respectively. Herein, each of the RAID controller and the disc driver, which is not essential in terms of operating the virtual machine, may exist inside the VMM in some cases and exist outside the VMM in some cases.

The network adapters 4104 and 4204, which are for connecting the physical machines 4001 and 4002, and the network 4006, respectively, can make the physical machines 4001 and 4002 look like as if they are connected with the discs 4003 and 4004, respectively, when viewed from the CPUs 4102 and 4202, respectively, with the setting of the network 4006. In terms of the packing, for example, making the network adapter look like as if it were a bridging device when viewed from the VMM enables this function to be realized; however the realization of the function is not limited hereto.

Virtual memory managers 4107 and 4207 have functions of making a management of allotting the memories 4103 and 4203 to the virtual machine so that no competition occurs, respectively.

Physical/virtual resource manager 4105 and 4205 manage statuses of the discs 4003 and 4004, which are connected to the physical machines 4001 and 4002, respectively, and statuses of correspondences thereof to the virtual disc, respectively.

Virtual machines 4121 and 4221 are virtual machines that operate on the VMMs 4106 and 4206, respectively, and virtual memories 4122 and 4222, and the virtual discs 4123 and 4223 are provided hereto as an utilizable resource, respectively.

A virtual CPU as well is similarly time-division-multiplexed by the VMM, and is provided to the virtual machine; however its explanation is omitted herein.

It is assumed that, as an initial status, each of the discs 4003 and 4004 belongs to the physical machine 4001 and has redundancy provided by the RAID controller 4109, and further, the virtual machine 4121 is in operation. Accompanied by issuing a "Migration" start command from the system manager 4005, the disc access manager 4110 starts to monitor an access to the virtual disc 4123 of the virtual machine 4121, and buffers its processing and processing data. Immediately after it, the disc access manager 4110 changes the setting so that the disc 4003 belongs to the physical machine 4002 by switching the network 4006. After the physical machine 4002 completes the recognition/setting of the disc 4003, the disc access manager 4110 issues a "Live Migration" command of the virtual machine, and starts a memory copy. The disc access manager 4110 converts the status of the virtual disc 4123 to a suspension status just before the last memory copy, that is, just before stopping the virtual machine 4121, transmits buffered data to the physical machine 4002, the disc access manager 4210 writes its buffered data into the disc 4003, and thereafter, makes the last memory copy, and the disc access manager 4210 cancels the disc suspension status and starts the virtual machine

4221 on the physical machine 4002 of the migration destination as a new virtual machine, so the "Live Migration" operation is completed.

With this operation, a function is provided of eliminating a difference of data between the discs 4003 and 4004, which is generated when each of them independently belongs to a different physical machine, with the switch control that is taken at the time of the "Migration"

Hereinafter, the "Migration" operation of migrating the virtual machine (VM) from the physical machine 4001 to the physical machine 4002 without interruption will be explained in details by employing a FIG. 5.

Figure 5:
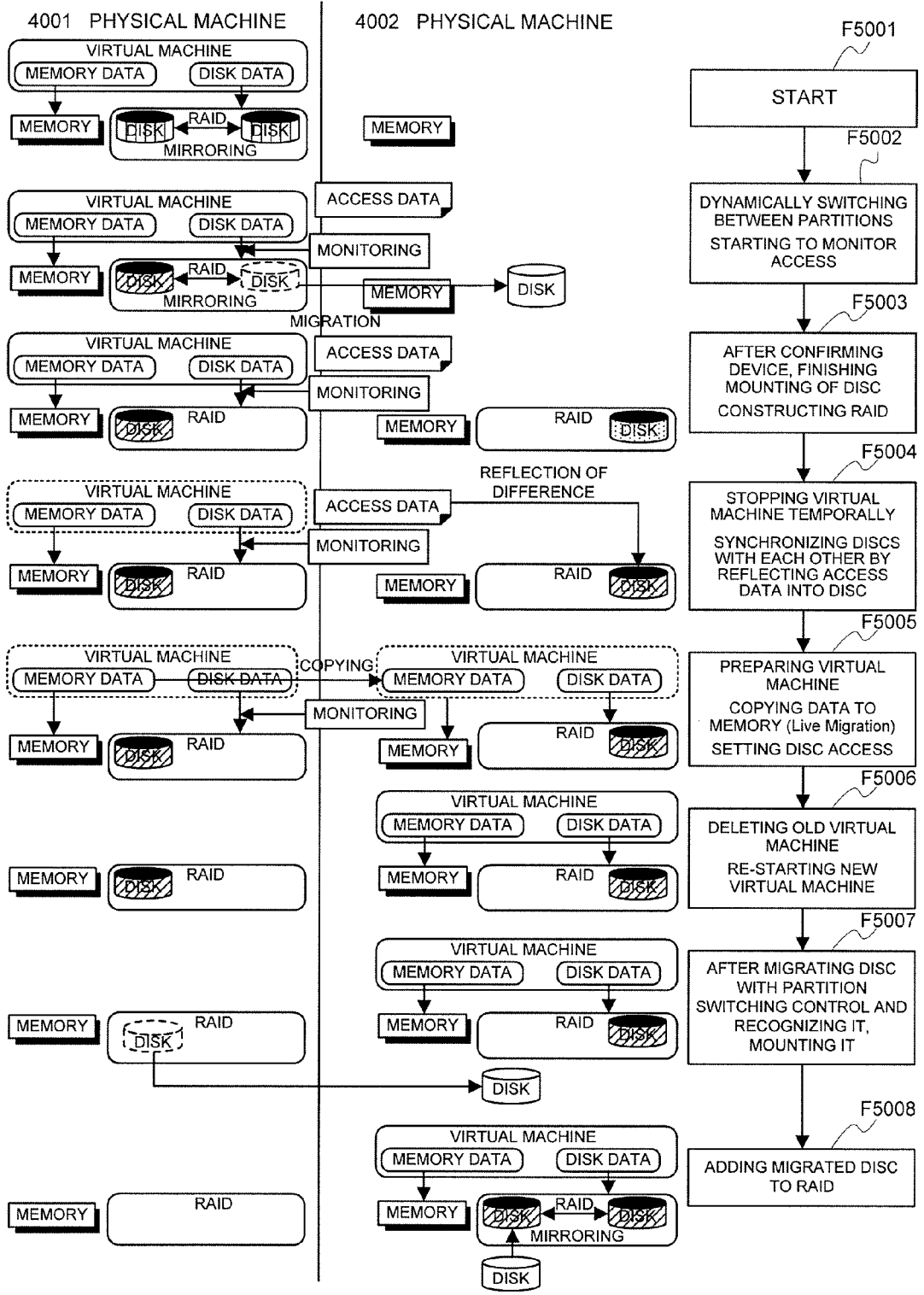
FIG. 5 is an operational flowchart in an exemplary embodiment 1 of the present invention.

In a left-end row of FIG. 5, the statuses of the virtual machines in the physical machine 4001 in FIG. 4 are illustrated, and the statuses of the physical machine 4002 are illustrated in a right-side row. An operational sequence will be explained below of providing a function of making a service no-interruption migration of the virtual machine operating on the physical machine 4001 to the physical machine 4002, of which the level is equivalent to that of the case of the system in which the "Live Migration" and the SAN have been combined, only with the partition switching machine without employing the special disc data-sharing machine such as the SAN.

(F5001)

The virtual machine is in operation on the physical machine 4001. The virtual machine is configured of memory data on the memory, and disc data.

(F5002)

Out of the discs mirrored by the redundancy-providing unit such as the RAID1 in the physical machine 4001, one disc is switched from the physical machine 4001 to the physical machine 4002. At this time, the switched disc, which has been lost when viewed from the physical machine 4001, is recognized to be a disc that is in a failure status, and employing the other one allows the system to be continued. However, at this moment, an attempt that the virtual machine accesses this disc and updates data is monitored, and its accessed data is preserved.

(F5003)

The disc switched to the physical machine 4002 with the partition switch is recognized, and the mounting of it is completed. Thereafter, a RAID1 configuration is constructed on the assumption that this disc and the other disc have failed. This practice, which generally needs a time of a several-second order, does not exert an influence over a service continuity of the virtual machine operating on the physical machine 4001 because the practice is done in the background.

(F5004)

After stopping the virtual machine temporally, thereby to prevent the data from being updated more than this, a difference between the both discs is eliminated by writing the monitored/preserved disc access data into the disc migrated to the physical machine 4002. Herein, for a purpose of shortening the interrupting time all the more, as described above, it is also possible to change the status of not the entirety of the virtual machine, but only the virtual disc to the suspension status.

(F5005)

The memory data of the virtual machine is copied to the memory on the physical machine 4002. This may be done, by employing the "Live Migration", being the related art. Thereafter, a disc access setting virtual machine is newly prepared for the disc for which the RAID1 has been constructed.

(F5006)

The virtual machine on the physical machine 4001 is deleted, and the virtual machine on the physical machine 4002 is started.

(F5007)

The disc remaining on the physical machine 4001 is migrated to the physical machine 4002 with the partition switch, and is mounted after the device recognition is finished.

(F5008)

The migrated disc is allowed to participate in the RAID.

With the flow mentioned above, the service continuity, of which the level is equivalent to that of the "Live Migration" in the system in which the disc data has been originally shared, is realized by performing a series of the operation of migrating, recognizing, and mounting the disc with the partition switch in the background, and making the required time, being a bottleneck, irrelevant to continuation of the service.

Herein, in (F5004), information of a difference between both discs is synchronized, and when this data quantity is very much, not only the technique of eliminating a difference in a lump at the last stage, but also the technique of gradually reflecting the data into the disc immediately after the moment that the monitoring has been started in (F5003) is possible.

Further, this access data is typically preserved in a record region secured on the memory, but the preservation of the data is not always limited hereto, and the access data is preserved in a record region other than that of the above disc in which the rate of the operation such as the writing and the reading does not become a bottleneck. For example, it is also possible to preserve the access data in a dedicated hardware other than the physical machines 4001 and 4002.

Further, the mirroring between the discs was explained with the RAID1 as an example; however the mirroring is not always limited hereto, and the redundancy-providing unit, which enables synchronization between both, is acceptable.

Next, a second exemplary example of the present invention will be explained in details by employing the accompanied drawings. Upon making a reference to FIG. 6, the second exemplary example of the present invention differs from the first exemplary embodiment in a point of including management agents 6130 and 6230 on the physical machines, respectively. A system manager 6005, which is physically connected to a network interface that is not shown in the figure via a network 6006, is capable of making communication with management agents 6130 and 6230. The system manager 6005, which is a management software application packaged on the computer resource, includes an interface to the administrator, and further, is capable of controlling the network setting connected through the network 6006. The management agent 6130, which is generally a software application installed on a physical machine 6001, performs various settings/controls according to a command from the system manager 6005 for a purpose of realizing a series of the operational flow explained in the first exemplary embodiment. However, the operational flow does not always need to be initiated with a command from the system manager 6005 as a trigger, and it is also possible for the management agent to autonomously perform the operational flow.

Figure 6:
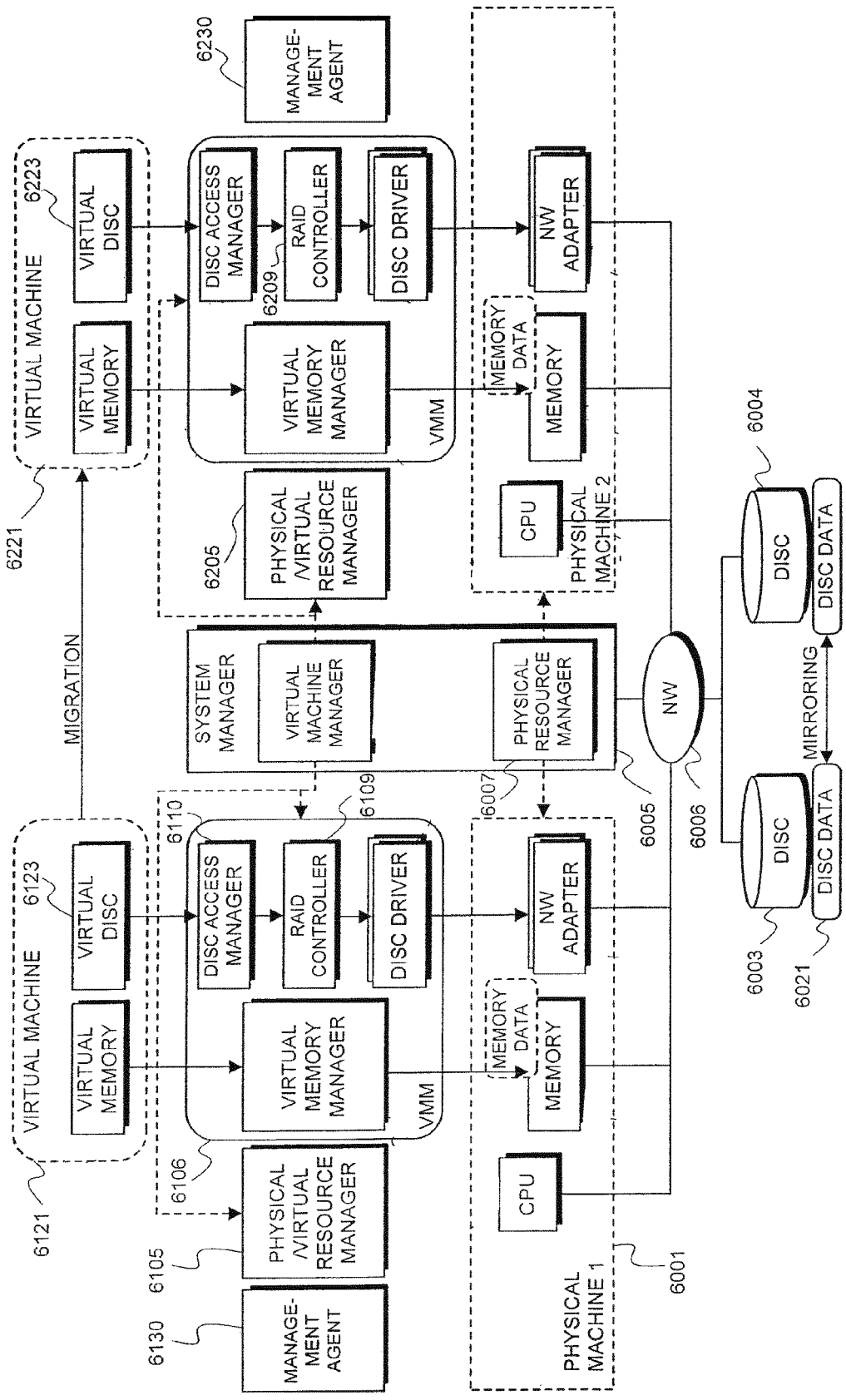
FIG. 6 is a block diagram for explaining an exemplary example 1 of the present invention.
Figure 7:
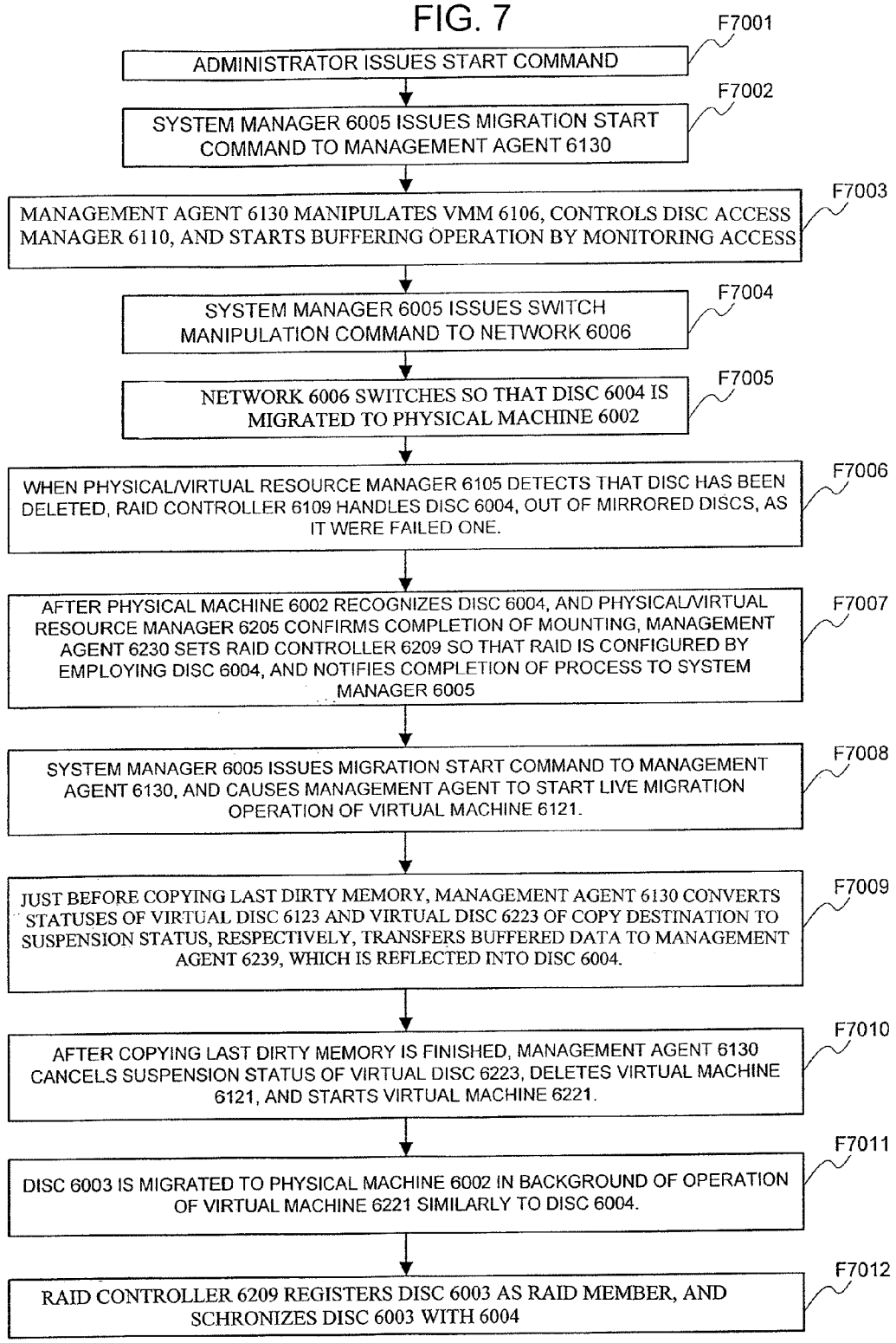
FIG. 7 is an operational flowchart in the exemplary example 1 of the present invention.

An operation of the present invention will be explained in details by employing FIG. 6 and FIG. 7.

(F7001)

The administrator issues a "Migration" start command to the system manager 6005.

(F7002)

The system manager 6005 issues a "Migration" start command to the management agent 6130.

(F7003)

The management agent 6130 manipulates a VMM 6106, controls a disc access manager 6110, and starts a buffering operation of the access data by monitoring the access.

(F7004)

The system manager 6005 issues a switch manipulation command to the network 6006.

(F7005)

The network 6006 makes the switch setting so that a disc 6004 is migrated to a physical machine 6002.

(F7006)

When a physical/virtual resource manager 6105 detects that the disc has been deleted, an RAID controller 6109 handles a disc 6004, out of the mirrored discs, as if it were a failed one. All of data written into a virtual disc 6123 is reflected only into disc data 6021 of a disc 6003.

(F7007)

After the physical machine 6002 recognizes the disc 6004, and a physical/virtual resource manager 6205 confirms completion of the mounting, the management agent 6230 sets an RAID controller 6209 so that the RAID is configured by employing the disc 6004, and notifies completion of the process to the system manager 6005. The other disc is handled as a failed disc in the current stage because only one disc exists.

(F7008)

The system manager 6005 issues a "Migration" start command to the management agent 6130, and causes the management agent 6130 to start the "Live Migration" operation of a virtual machine 6121 (consecutively copying the memory data of the virtual machine 6121).

(F7009)

Just before copying the last dirty memory, the management agent 6130 converts statuses of a virtual disc 6123, and a virtual disc 6223 of a copy destination to a suspension status, respectively, transfers to the management agent 6230 the buffered data, which is reflected into the disc 6004.

(F7010)

After the management agent 6130 finishes the copying of the last dirty memory, it cancels the suspension status of the virtual disc 6223, deletes the virtual machine 6121, and starts a virtual machine 6221.

(F7011)

The disc 6003 is migrated to the physical machine 6002 in the background of the operation of the virtual machine 6221 similarly to the disc 6004.

(F7012)

The RAID controller 6209 registers the disc 6003 as a RAID member, and synchronizes it with the disc 6004. Herein, the operation (F7004) to (F7007) ranging the switching to the mounting needs a time of a several-second order; however these operations do not exert an influence over a continuity of the service because they are performed in the background for service provision to the user.

With the suspension of the virtual disc, a continuity of the process other than the access to the disc is maintained until the last moment just before copying the last dirty memory because the virtual machine itself continues its operation. Further, in a case where the memory capacity for buffering has reached its limit on the half way of the process, converting the status of the virtual disc to a suspension status at that time point enables buffer overflow to be prevented.

The system manager 6005 and the network 6006 may be connected through a network switch in some cases, and may be connected through a dedicated line in some cases.

Next, a third exemplary example of the present invention will be explained in details by employing the accompanied drawings.

Figure 8:
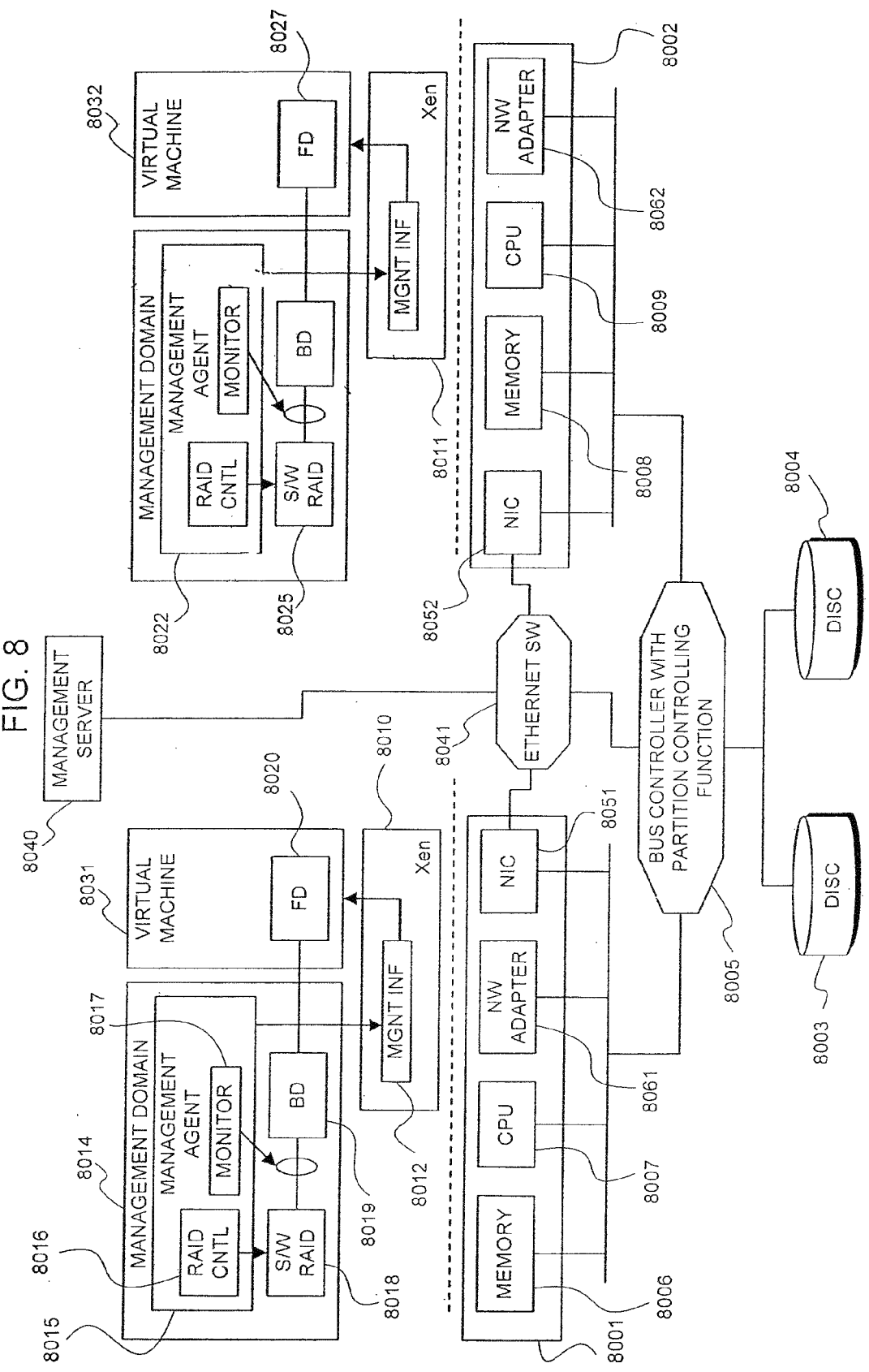
FIG. 8 is a block diagram for explaining an exemplary example 2 of the present invention.

Upon making a reference to FIG. 8, such an exemplary example corresponds to the first exemplary embodiment of the present invention.

This exemplary example includes a management server 8040 as a system manager, a bus controller with a partition control function 8005 for controlling a bus that is typified by a PCI bus as a switching unit, physical servers 8001 and 8002 each having a CPU, a memory, etc. as a physical machine, each of which is mutually connected to the other via an Ethernet switch 8041.

Further, the physical servers 8001 and 8002 include CPUs 8007 and 8009, memories 8006 and 8008, network interfaces (NIC) 8051 and 8052, network adapters 8061 and 8062, respectively.

The bus controller with a partition control function 8005 can make the setting so that each of discs 8003 and 8004 belongs to either the physical server 8001 or the physical server 8002. Each of the discs 8003 and 8004 is recognized through the network adapter, which is recognized, for example, as a bridging device.

An Xen 8010, which operates as a virtualizer on the physical server 8001, provides a function of allowing a management domain 8014 to control/manage a virtual machine 8031 through a management interface 8012.

The management domain 8014, which is a virtual machine that is exclusively engaged in management, mainly provides a function of managing a virtual machine 8031 and a device access function, and includes management agent software 8015, a software RAID 8018, and a backend driver 8019 inside it. The software RAID 8018 provides a function of mirroring the discs 8003 and 8004, and making the mirrored discs look like as if they were one disc, and an RAID control function 8016 within the management agent software 8015 performs various settings and controls thereof.

So as to access the device, in particular, the discs 8003 and 8004, the application process that operates on the virtual machine 8031 gives an access request to a frontend driver 8020, being a virtual driver, the frontend driver 8020 transfers its request to the backend driver 8019 within the management domain 8014, and the backend driver 8019 gives a access request to the disc device that looks like as if it is one virtual disc due to the software RAID 8018. An access monitoring function 8017 monitors an access to the virtual disc that is made by the backend driver 8019.

Hereinafter, an operation of migrating the virtual machine 8031 to the physical server 8002 will be explained in details.

When a management server 8040 gives a "Migration" start command of the virtual machine 8031 to the management agent software 8015, the management agent software 8015 suspends the status of the virtual device (herein, the frontend driver 8020) of the virtual machine 8031 and starts up the access monitoring function 8017, thereby to start to acquire the access data, and thereafter, stars the frontend driver 8020 once again. Herein, the entirety of the virtual machine 8031 may be stopped temporally, but in this case, as a rule, all operations on the virtual machine are stopped temporally. The management server 8040 controls the bus controller with partition control function 8005, and migrates the disc 8004 to the physical server 8002.

The physical server 8002 recognizes that the disc 8004 has been added to its own system bus, mounts it onto the file system, and constructs the RAID1 with a software RAID 8025. This is realized with a HotPlug function that is standardly supported in Linux etc., and the software RAID, and this series of the migrating processes requires a time in the order of several seconds.

When the migration has been finished completely, a management agent software 8022 issues a completion notification to the management server 8040, and the management server 8040 notifies a "Migration" start command of the virtual machine to the management agent software 8015. The management agent software 8015 issues a "Live Migration" command, and copies the memory data associated with the virtual machine 8031 to a memory region of a virtual machine 8032 newly prepared on an Xen 8011. At this moment, the management agent software 8015 repeats the practice of the one-after-another copy, that is, the practice of furthermore copying the memory data (dirty memory) newly renewed during the copying of data, temporally stops the virtual machine when the quantity of data, which is newly written into the memory, becomes balanced with the dirty memory quantity, and performs the last copy. Herein, the management agent software 8015 synchronizes the disc 8003 and the disc 8004 with each other by firstly converting the statuses of the virtual discs, that is, the frontend drivers 8020 and 8027 to a suspension status, respectively, just before the last copy, and transferring the buffered data to the management agent software 8022, and writing it into the disc 8004. The copying of this buffered data, as mentioned above, may be performed in a lump at the last stage in some cases, and the copying may be repeated one after another in the half way stage in some cases.

When the management agent software 8015 confirms that the writing of the buffered data has been finished, it temporally stops the virtual machine 8031, performs the copying of the last dirty memory, cancels the suspension status of the frontend driver 8027, deletes the virtual machine 8031, and starts an operation of the virtual machine 8032.

Thereafter, the management agent software 8015 migrates the disc 8003 to the physical server 8002 by controlling the bus controller with partition control function 8005, adds it to the previously prepared RAID1 after it has been mounted onto the file system on the physical server 8002 with the HotPlug function, and performs a mirroring process for the disc 8004.

With the forgoing, it is possible to curtail the service stopping time ranging the migrating of the disc to the mounting of it onto the file system at a level of an order of the time necessary only for copying the memory.

Next, a fourth exemplary example of the present invention will be explained in details by employing the accompanied drawings.

Figure 10:
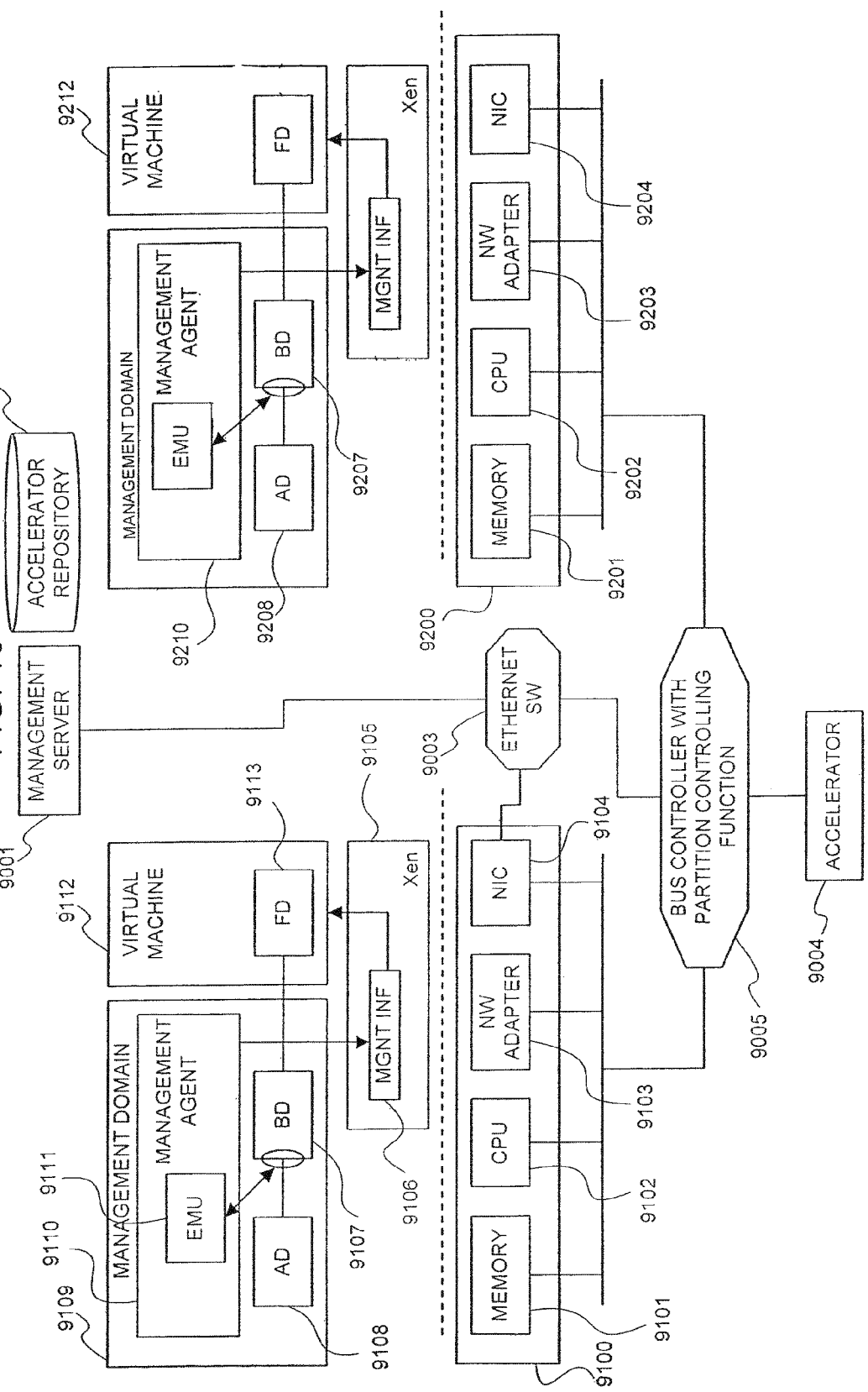
FIG. 10 is a block diagram for explaining an exemplary example 4 of the present invention.

Upon making a reference to FIG. 10, such an exemplary example corresponds to the first exemplary embodiment of the present invention.

This exemplary example includes a management server 9001 as a system manager, a bus controller with a partition control function 9005 for controlling a bus that is typified by a PCI bus as a switcher, physical servers 9100 and 9200 each having a CPU, a memory, etc. as a physical machine, each of which is connected to the other via an Ethernet switch 9003.

The management servers 9001 may include a repository 9002 of accelerator information existing within the system.

Further, the physical servers 9100 and 9200 include CPUs 9102 and 9202, memories 9101 and 9201, network interfaces (NIC) 9104 and 9204, network adapters 9103 and 9203, respectively.

The bus controller with a partition control function 9005 can make the setting so that an accelerator 9004 belongs to either the physical server 9100 or the physical server 9200. The accelerator 9004, which is a function device that is typified by a TCP off-load engine, is not limited hereto. The accelerator is recognized as a device connected to the physical machine through the network adapter, which is recognized, for example, as a bridging device.

An Xen 9105, which operates on the physical server 9100 as a virtualizer, provides a function of allowing a management domain 9109 to control/manage a virtual machine 9112 through a management interface 9106. The Xen was exemplified as a virtualizer, but the virtualizer is not always limited thereto.

The management domain 9109, which is a virtual machine that is exclusively engaged in management, mainly provides a function of managing the virtual machine 9112 and a device access function, and includes management agent software 9110, a backend driver 9107, and an accelerator driver 9108 inside it.

In order for the application process operating on the virtual machine 9112 to utilize the accelerator 9004, the application process gives an access request to a frontend driver 9113, being a virtual resource, the frontend driver 9113 transfers its request to the backend driver 9107 within the management domain 9109, the backend driver 9107 transfers the process to the accelerator driver 9108, and the accelerator driver 9108 accesses the accelerator 9004, thereby allowing its utilization to be realized.

The management agent 9110 includes an accelerator emulation function inside it.

Hereinafter, an operation of migrating the virtual machine 9112 to the physical server 9200 will be explained in details.

When the management server 9001 issues a "Migration" start command of the virtual machine 9112 to the management agent software 9110, the management agent software 9110 firstly converts the status of a function of an emulation 9111 to an "Enable" status, and makes the setting so that the process of the backend driver 9107 to the accelerator driver 9108, being a request for utilizing the accelerator 9004, is all transferred to the emulation 9111. The emulation 9111 has a function of performing the process, which is to be performed in the accelerator 9004, being a physical resource, in a software manner. For example, in a case where the accelerator is a TCP off-load engine, the emulation 9111 performs the TCP protocol process as software instead of employing the accelerator. This emulation function may be pre-installed in some cases, and software necessary may be downloaded and installed in some cases by inquiring information registered into the accelerator information repository 9002 of the management server 9001 with the issue of the "Migration" start command as a trigger.

Upon confirming that the emulation 9111 has started the accelerator emulation, the management server 9001 starts the process of migrating the accelerator 9004 from the physical server 9100 to the physical server 9200 by changing the setting of the bus controller with a partition control function 9005.

Upon confirming that the accelerator 9004 has been mounted, management agent software 9210 downloads and installs software necessary from the management server 9001, and after confirming the status of utilizability of the accelerator, notifies its utilizability to the management server 9001.

The management server 9001 issues a "Live Migration" start command of the virtual machine 9112 to the management agent software 9110, the memory data of the virtual machine 9112 is copied to the memory region of the virtual machine 9212, a transfer channel between the backend driver 9207 and the accelerator driver 9208 is established so that the virtual machine 9212 can utilize the accelerator 9004, and thus, the "Live Migration" operation of the virtual machine is completed as described above.

The above-mentioned operations were explained in the order of the operation of switching from the accelerator to the emulation in the physical machine 9100→the operation of migrating the accelerator to the other partition→the operation of the "Live Migration" of the virtual machine, and besides, the similar process may be performed in the order of the operation of "Enabling" the emulation function of the accelerator in the physical machine 9200→the operation of the "Live Migration" of the virtual machine→the operation of migrating the accelerator to the other partition-→the operation of "Disabling" the emulation function of the accelerator, and the operation of making a switchover to an access to the accelerator driver in the physical machine 9200.

The present invention is applicable to the application such as a configuration/management of an IT/NW system in a virtualization environment having a plurality of the computer machines in which the resources are efficiently utilized.

While the invention has been particularly shown and described with reference to exemplary examples thereof, the invention is not limited to these exemplary examples. It will be understood by those of ordinary skill in the art that various changes in form and details may be made therein without departing from the spirit and scope of the present invention as defined by the claims.

What is claimed is:

1. A virtual machine configuration system, comprising:
   a computer system sectioned into at least first and second partitions connected through a network circuit, said first partition including at least first and second hard discs which are registered therewith and a first memory, said second partition including at least a second memory;
   a virtual disc configured by mirroring said at least first and second hard discs;
   a virtualizer for migrating a virtual machine containing said virtual disc from said first partition to said second partition, said virtualizer:
   dividing a utilization time of each of said computer systems into time divisions and allotting said time divisions to a plurality of operating systems, thereby enabling each operating system to appear to operate simultaneously on a respective virtual machine;
   removing said first hard disc from said first partition and re-registering said first hard disc with said second partition;
   after removal of said first hard disc from said first partition and before completion of said re-registration of said first hard disc with said second partition, monitoring whether an access to said virtual disc has been requested and, if so, implementing a software emulation to emulate access to said virtual disc by performing a substitute operation comprising buffering data associated with said request;
   after said first hard disc has been re-registered with said second partition, converting a status of said virtual disc to a temporal wait status and writing said buffered data onto said re-registered first hard disc;
   copying memory data of said first memory on said first partition to said second memory on said second partition; and
   removing said second hard disc from said first partition and re-registering said second hard disc with said second partition.

2. The virtual machine configuration system according to claim 1, wherein said first and second hard discs are migrated using a dynamic bus controller.

3. The virtual machine configuration system according to claim 1, wherein said network circuit is Ethernet.

4. The virtual machine configuration system according to claim 1, wherein a virtual machine monitor is employed as said virtualizer.

5. The virtual machine configuration system according to claim 1, wherein software RAID 1 is employed as a way of synchronization.

6. The virtual machine configuration system according to claim 1, further comprising an external management server and management agent software which exists on each partition; and wherein an operation of said management agent software is performed in response to an issuance of a command to said management agent software from said external management server.

7. A virtual machine configuration method for use with a computer system sectioned into at least first and second partitions connected through a network circuit, said first partition including at least first and second hard discs which are registered therewith and a first memory, said second partition including at least a second memory, said method migrating a virtual machine containing a virtual disc from said first partition to said second partition, said method comprising:
   dividing a utilization time of each of said computer systems into time divisions and allotting said time divisions to a plurality of operating systems, thereby enabling each operating system to appear to operate simultaneously on a respective virtual machine;
   removing said first hard disc from said first partition and re-registering said first hard disc with said second partition;
   after removal of said first hard disc from said first partition and before completion of said re-registration of said first hard disc with said second partition, monitoring whether an access to said virtual disc has been requested and, if so, implementing a software emulation to emulate access to said virtual disc by performing a substitute operation comprising buffering data associated with said request;
   after said first hard disc has been re-registered with said second partition, converting a status of said virtual disc to a temporal wait status and writing said buffered data onto said re-registered first hard disc;
   copying memory data of said first memory on said first partition to said second memory on said second partition; and
   removing said second hard disc from said first partition and re-registering said second hard disc with said second partition.

8. The virtual machine configuration method according to claim 7, wherein said first and second hard discs are migrated using a dynamic bus controller.

9. The virtual machine configuration method according to claim 7, wherein the network circuit is Ethernet.

10. The virtual machine configuration method according to claim 7, wherein software RAID 1 is employed as a way of synchronization.

11. A program stored on a non-transitory, computer readable medium that causes an information processing unit to execute a virtualization process on a computer system sectioned into at least first and second partitions connected through a network circuit, said first partition including at least first and second hard discs which are registered therewith and a first memory, said second partition including at least a second memory, said virtualization process comprising:
  dividing a utilization time of each of said computer systems into time divisions and allotting said time divisions to a plurality of operating systems, thereby enabling each operating system to appear to operate simultaneously on a respective virtual machine;
  removing said first hard disc from said first partition and re-registering said first hard disc with said second partition;
  after removal of said first hard disc from said first partition and before completion of said re-registration of said first hard disc with said second partition, monitoring whether an access to a virtual disc, configured by mirroring said at least said first and second hard discs, has been requested and, if so, implementing a software emulation to emulate access to said virtual disc by performing a substitute operation comprising buffering data associated with said request;
  after said first hard disc has been re-registered with said second partition, converting a status of said virtual disc to a temporal wait status and writing said buffered data onto said re-registered first hard disc;
  copying memory data of said first memory on said first partition to said second memory on said second partition; and
  removing said second hard disc from said first partition and re-registering said second hard disc with said second partition.

* * * * *